(12) United States Patent
Sheehan et al.

(10) Patent No.: US 6,292,175 B1
(45) Date of Patent: Sep. 18, 2001

(54) ERGONOMIC TRACKBALL DEVICE

(75) Inventors: Peter Sheehan, Bray; Cathal Loughnane, Tipperary, both of (IE)

(73) Assignee: Logitech, Inc., Fremont, CA (US)

( * ) Notice: Subject to any disclaimer, the term of this patent is extended or adjusted under 35 U.S.C. 154(b) by 0 days.

(21) Appl. No.: 09/510,091

(22) Filed: Feb. 22, 2000

Related U.S. Application Data (63) Continuation-in-part of application No. 29/118,496, filed on Feb. 9, 2000.

(51) Int. Cl.$^7$ .................................................... G09G 5/08
(52) U.S. Cl. ......................... 345/167; 345/163; D14/409
(58) Field of Search ................................. 345/163, 167; D14/402–405, 408–410; 273/148 B, 438

(56) References Cited

U.S. PATENT DOCUMENTS

| | | | |
|---|---|---|---|
| D. 350,737 | 9/1994 | Chen | D14/114 |
| D. 377,486 | 1/1997 | Shih et al. | D14/114 |
| D. 377,487 | 1/1997 | Shih et al. | D14/114 |
| D. 401,919 | 12/1998 | Chiang | D14/114 |
| D. 411,837 | 7/1999 | Sheehan | D14/114 |
| 4,862,165 | 8/1989 | Gart | 341/20 |
| 5,414,445 | 5/1995 | Kaneko et al. | 345/163 |
| 5,576,733 | 11/1996 | Lo | 345/163 |
| 5,726,683 | 3/1998 | Goldstein et al. | 345/168 |
| 5,894,302 | 4/1999 | Scenna et al. | 345/163 |
| 5,966,118 * | 10/1999 | Miyakawa | 345/163 |
| 6,005,553 | 12/1999 | Goldstein et al. | 345/163 |
| 6,031,518 * | 2/2000 | Adams et al. | 345/163 |
| 6,157,370 * | 12/2000 | Kravtin et al. | 345/163 |

* cited by examiner

Primary Examiner—Regina Liang
(74) Attorney, Agent, or Firm—Townsend and Townsend and Crew LLP (57) ABSTRACT

A pointing device provides increased comfort by supporting the user's hand to avoid extreme positions of posture ranges of the various fingers and joints of the hand and wrist. The device includes an upper surface having a crown on which to rest a palmar region of the palm of the hand of a user substantially at the metacarpal-phalangeal (MP) joint of the second digit and at least a portion of the metacarpal-phalangeal joint of the third digit. The upper surface has a front region on which to rest the second through fourth digits. The front region extends downwardly from the crown in a forward direction. The upper surface includes a back region on which to rest the hypothenar region of the hand. The back region extends downwardly from the crown in a rearward direction, and is configured to substantially avoid contacting the carpal tunnel and to substantially avoid supporting the thenar region of the hand. The housing further includes a generally concave inner side surface and a trackball having a portion exposed from the inner side surface to face the thumb, and an outer side surface on which to place the fifth digit. The inner side surface includes a ledge disposed below and to the left of the trackball on which the thumb may rest.

34 Claims, 4 Drawing Sheets

ERGONOMIC TRACKBALL DEVICE

This application is a continuation-in-part of and claims the benefit of commonly assigned U.S. patent application Ser. No. 29/118,496 entitled "Ergonomic Trackball", filed Feb. 9, 2000. The disclosure of this application is incorporated herein by reference.

BACKGROUND OF THE INVENTION

This invention relates generally to pointing devices and, more particularly, to an ergonomic pointing device.

Pointing devices such as computer trackball devices are commonly used, for example, to control cursor movement on a computer screen. The use of pointing devices often involves highly repetitive hand and finger movements and positions. Some forms of repetitive stress disorder may be attributed to the use of pointing devices, particularly where awkward and stressful movements and/or positions are involved. Pointing devices having configurations that force the wrist, hand, and fingers of the user to assume awkward and stressful positions and/or movements are undesirable.

Existing pointing devices have evolved with ergonomic considerations in mind. Assignee's own U.S. Design Pat. No. 411,837 shows a shape that guides the hand away from full pronation.

U.S. Pat. No. 4,862,165 to Gart discloses a mouse having an arched metacarpal-phalangeal support surface for supporting the anterior surface of the hand and a concave thenar pad support surface for supporting the thenar pad of the hand.

U.S. Pat. No. 5,726,683 to Goldstein et al. discloses a mouse having a top surface, a right side surface, and a substantially vertically rising left side surface. The top surface has a negative slope from front to rear in a range of 15–30° and from left to right in a range of 20–30°, and provides at the front of the top surface a phalanx support. The top surface includes a peak running from front to back oriented to lie under the operator's thenar eminence providing support thereto and a surface through which the operator can push the mouse with his or her thenar eminence.

U.S. Pat. No. 5,576,733 to Lo discloses a mouse having an upright, primary finger-supporting surface for supporting all of the fingers of an upright hand in straight positions and in an upright stack. The mouse includes an opposite thumb-supporting surface for supporting the thumb.

U.S. Pat. No. 5,894,302 to Scenna et al. discloses a mouse including an upper surface having a hump for supporting the triangular area of the hand encircled by the thenar region, the hyperthenar region, and the region below the metacarpal-phalangeal joints. The upper surface includes a tail having a rising portion to underlie and bear the pressure of the region of the user's hand where the thenar and hyperthenar converge. The finger buttons in the front are elevated above the hump.

U.S. Pat. No. 5,414,445 to Kaneko et al. discloses a mouse including a top surface having a bulge for supporting the metacarpal-phalangeal joint ridge. The mouse supports the hand such that the wrist rests on the working surface on which the mouse is disposed.

SUMMARY OF THE INVENTION

The present invention is directed to a pointing device that improves upon the prior art with a unique combination of features and new modifications to provide increased comfort to the user. The invention does so by providing a pointing device that supports the user's hand to avoid extreme positions of posture ranges of the wrist and the fingers and joints of the hand such as, for example, wrist extension, full pronation of the hand, and abduction or adduction of the thumb. The device is further configured to reduce pressure applied to the carpal tunnel, and to minimize contact pressure on the sensitive areas of the wrist by elevating it above the working surface. As a result, the pointing device tends to promote more relaxed hand and wrist posture, minimize static muscle loading, and reduce physical stresses during operation of the pointing device.

In accordance with an aspect of the invention, a pointing device for use on a working surface includes a bottom configured to be placed on the working surface, and at least one finger-operated pointing member. In a specific embodiment, the pointing device is a computer trackball device.

The device includes an upper surface having a crown for contacting a pahnar region of the palm of the hand of a user substantially at the metacarpal-phalangeal (MP) joint of the second digit and desirably at least a portion of the MP joint of the third digit. The crown is higher in elevation than remaining portions of the upper surface relative to the bottom. Because one of the more repetitive tasks in operating the device entails pressing buttons using the second and/or third digits which involves movements mainly around the MP joints of those digits, the crown advantageously provides primary support from those MP joints toward the wrist.

The upper surface extends from the crown downwardly in a forward direction toward the tips of the second and third digits to form a front region, downwardly in a rearward direction toward the wrist of the user to form a back region, and downwardly in an outward direction toward the MP joints of the fourth and fifth digits to form an outside region. A transverse hump extends from the crown in the outward direction for contacting a palmar region substantially at the MP joints of the fourth and fifth digits (and possibly a portion of the MP joint of the third digit). The transverse hump slopes downwardly from the crown to guide the hand away from full pronation. The back region supports the hypothenar region of the hand.

The crown and the back region preferably are sufficiently high relative to the bottom to maintain the wrist above the working surface to promote a near-neutral wrist position with little or no wrist extension, and to minimize contact pressure against sensitive areas of the wrist due to prolonged contact with the working surface.

The back region slopes downwardly with a sufficiently large curvature in the rearward direction to substantially avoid contacting the carpal tunnel region of the palm, thereby reducing pressure on the carpal tunnel. For example, the back region is typically configured to avoid contacting at least the middle and proximal portions of the carpal tunnel but may contact the distal portion of the carpal tunnel. In a specific embodiment, the back region has a greater curvature in the rearward direction than the front region in the forward direction.

The back region includes a "thenar void" to substantially avoid supporting the thenar region, so that the thumb is allowed to hang down in a substantially neutral thumb position and to move freely relative to the pointing device. This eliminates pressure and loading on the thenar region due to interference from a thenar support found in conventional mouse devices.

The housing includes an inner side surface, and a trackball having a portion exposed from the inner side surface to face the thumb. The inner side surface desirably is generally concave in the region adjacent the trackball. The inner side surface has a ledge disposed below and inwardly to the left of the ball and being configured to support the distal phalange of the thumb.

The crown and the back region desirably are sufficiently high in elevation to allow the distal phalange of the thumb to rest on the ledge or the working surface in a rest position between the extreme positions of adduction and abduction. In a specific embodiment, the thumb is about half-way between adduction and abduction.

The front region may include buttons on which to place the second and third digits. The buttons are desirably aligned with the phalanges of the second and third digits, respectively. In this way, the digits can operate the buttons efficiently by pressing downward in a substantially neutral position without awkward or strained movements (i.e., abduction or adduction).

DESCRIPTION OF THE SPECIFIC EMBODIMENTS

FIGS. 1–7 show the housing of a trackball device 10 having at least one finger-operated pointing member. The device 10 includes an asymmetrical upper surface 12 and a bottom 14 that typically is generally flat for operating on a flat working surface. The upper surface 12 has a crown 16 that is desirably rounded and disposed for contacting a palmar region of the palm of the hand of the user. The crown 16 is higher in elevation than remaining portions of the upper surface 12 relative to the bottom 14. The trackball device 10 of FIGS. 1–7 is configured for a right-handed user, but it is appreciated that the principles of the present invention can be used for constructing a trackball device for a left-handed user (e.g., a mirror image of the embodiment shown).

Figure 8:
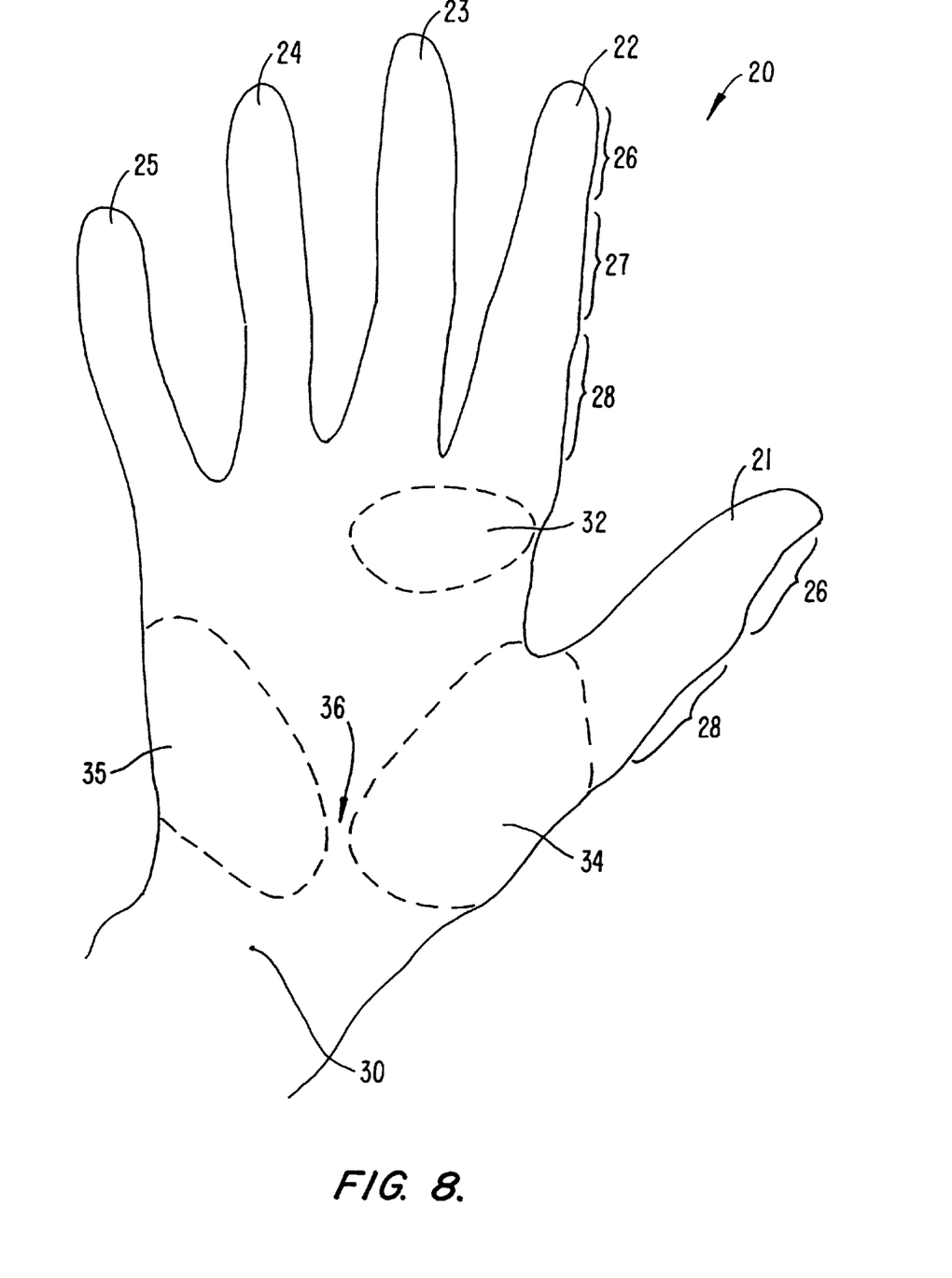
FIG. 8 is a schematic view of a hand illustrating the palm and surrounding regions.

FIG. 8 shows a right hand 20 having a first digit or thumb 21, second digit 22, third digit 23, fourth digit 24, and fifth digit 25. Each of the second through fifth digits 22–25 has three phalanges, including a distal phalange 26, a middle phalange 27, and a proximal phalange 28. The thumb 21 has a distal phalange 26 and a proximal phalange 28. The metacarpal and carpal bones extend between the five digits 21–25 and the wrist 30. The MP joints of the digits 21–25 are located between the proximal phalanges 26 of the digits 21–25 and the corresponding metacarpals. FIG. 8 shows a contact region 32 substantially at, typically just below, the MP joints of the second and third digits 22, 23. More desirably, the contact region 32 is just below the MP joint of the second digit 22 and a portion of the MP joint of the third digit 23. The crown 16 of the trackball device 10 in FIGS. 1–7 is configured to contact and support the contact region 32 of the user's hand 20. Accordingly, the crown 16 is asymmetrically located inwardly to the left side of the upper surface 12 of the device 10.

As shown in FIG. 8, at the base of the thumb 21 is the thenar region 34, while on the other side of the palm is the hypothenar region 35. The carpal tunnel 36 is disposed between the thenar region 34 and hypothenar region 35.

As shown in FIGS. 1–7, the upper surface 12 slopes from the crown 16 downwardly in a forward direction to a front region 40, which is provided for supporting the distal portions of the second and third digits 22, 23 and desirably also the fourth digit 24. The upper surface 12 slopes from the crown 16 downwardly in a rearward direction to a back region 42 oriented toward the wrist 30. The upper surface 12 slopes from the crown 16 downwardly in an outward direction to an outside region 46 oriented toward the MP joints of the fourth and fifth digits 24, 25 on the right side of the hand 20. The rounded crown 16 with downward slopes in the above-specified directions toward the bottom 14 allows pivoting of the hand 20 and flexion of the hand 20 in a more neutral position, away from extreme positions of the posture ranges and with reduced static loading on the various joints of the hand 20. The upper surface 12 may include a surface texture that minimizes sliding of the hand.

Figure 1:
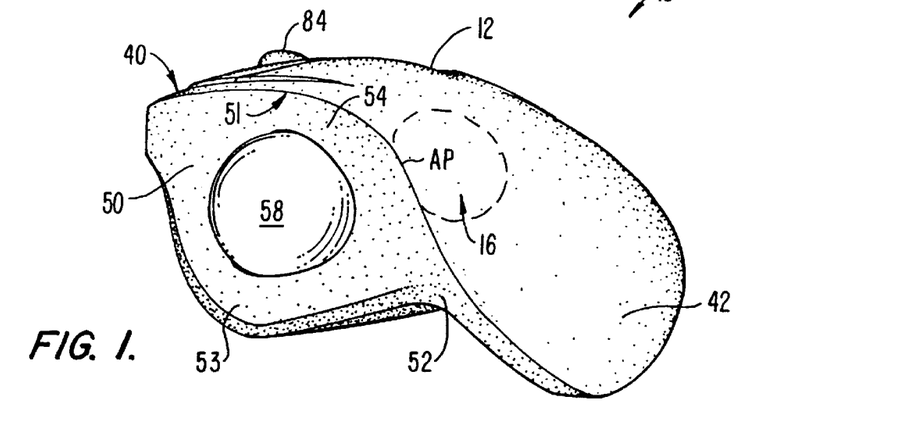
FIG. 1 is a perspective view of a trackball device in accordance with an embodiment of the present invention.
Figure 2:
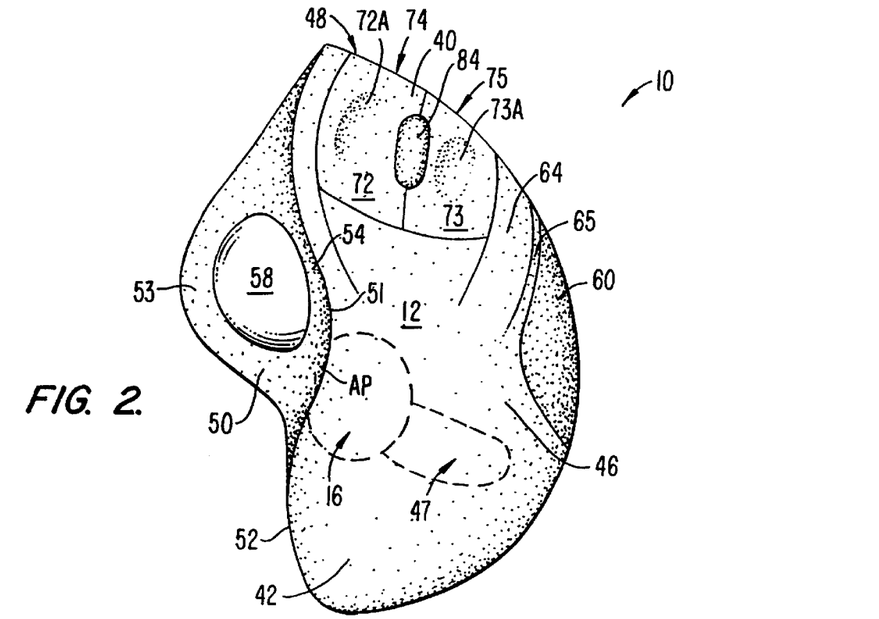
FIG. 2 is a top plan view of the trackball device of FIG. 1.
Figure 4:
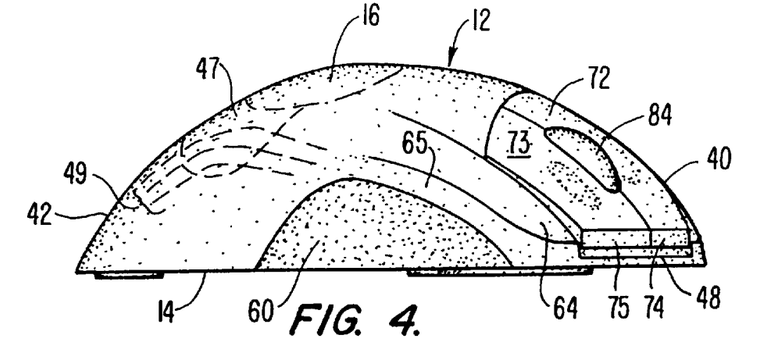
FIG. 4 is a right side elevational view of the trackball device of FIG. 1.

The contour between the front region 40 and the back region 42 forms a transverse hump 47 extending from the crown 16 outwardly to the outside region 46, which is shown in FIGS. 1, 2, and 4. As best seen in FIG. 4, the contour of the outside region 46 can be represented by a series of arches 49 oriented in the direction between the front and back of the device 10. The transverse hump 47 covers an area overlying the peaks of the arches 49.

The crown 16 provides the primary support for the hand 20, and bears substantial surface pressure for manipulating various finger-operated pointing members on the device 10. The crown 16 supports the hand 20 at the contact region 32 substantially at the MP joint of the second digit 22 and at least a portion of the MP joint of the third digit 23. The MP joints of the fourth and fifth digits 24, 25 (and possibly a portion of the MP joint of the third digit 23) rest substantially along the transverse hump 47 extending from the crown 16 outwardly to the outside region 46. The transverse hump 47 is not oriented in a straight left-right direction. Rather, the outward portion of the transverse hump 47 curves toward the back region 42 to conform to the shape of the hand 20.

Figure 3:
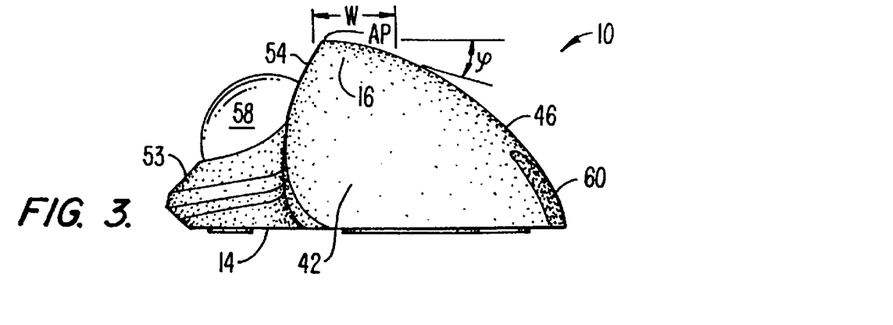
FIG. 3 is a front elevational view of the trackball device of FIG. 1.

Supporting the contact region 32 substantially at the MP joint of the second digit 22 and at least a portion of the MP joint of the third digit 23 on the crown 16 is advantageous because one of the more common repetitive tasks in operating the device 10 involves application of force via the second and/or third digits 22, 23, for instance, in pressing buttons provided in the front region 40. Most of the movement of those digits 22, 23 takes place about the MP joints. The crown 16 provides primary support from those MP joints toward the wrist 30. The crown 16 is desirably shaped to support a relatively wide contact region 32 as shown in FIG. 8 to provide even support and load distribution. The crown 16 is the relatively flat region of the upper surface 12, and may be defined by the angle relative to the bottom from the apex AP. For instance, the crown 16 may be defined as a region surrounding the apex AP and having an angle $\phi$ relative to the bottom 14 of less than about 10–25°, as illustrated in FIG. 3. The width W is typically about 1.25–2 inches.

Moreover, the transverse hump 47 provides support substantially at or near the MP joints of the fourth and fifth digits 24, 25 (and possibly a portion of the MP joint of the third digit 23). Forces may be applied via the MP joints of the fourth and fifth digits 24, 25 in gripping the device 10. By supporting the hand 20 substantially at or near the MP joints of the digits 22–25, the crown 16 and the hump 47 reduce static loading on the joints of the hand 20 and allow the digits 22–25 to operate in a more neutral manner.

Figure 5:
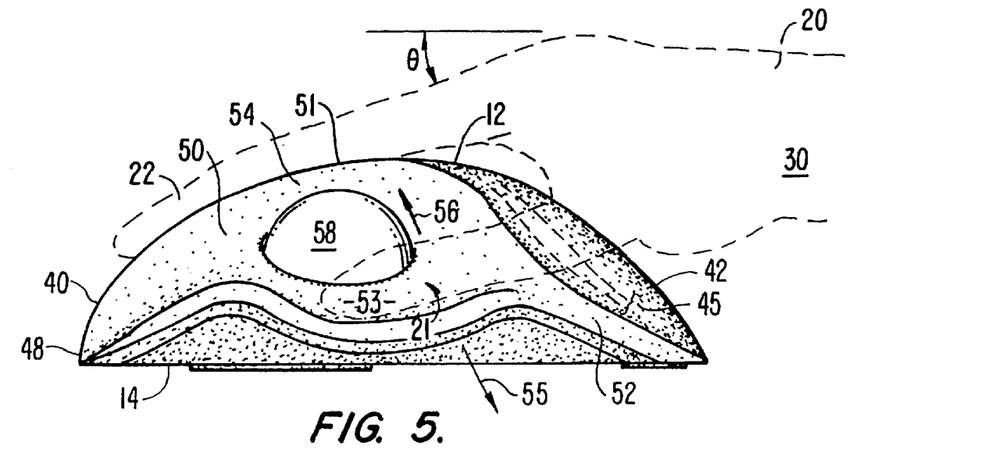
FIG. 5 is a left side elevational view of the trackball device of FIG. 1.

The crown 16 and the back region 42 of the upper surface 12 preferably are sufficiently high relative to the bottom 14 to maintain the wrist 30 of the user above the working surface on which the bottom 14 is disposed, as shown in FIG. 5. For example, the maximum height of the crown 16 is at least about 1.25 inches, more desirably about 1.5–2.25 inches. In conjunction with a downward slope in the front region 40 and outside region 46 from the crown 16 for supporting the second through fifth digits 22–25, the elevation of the wrist 30 promotes a near-neutral wrist position with little or no wrist extension, thereby reducing static loading at the wrist 30. Elevating the wrist 30 above the working surface prevents the application of pressure and loading against sensitive areas of the wrist 30 due to prolonged contact with the working surface. It also tends to limit side-to-side movement of the wrist 30 and encourage greater use of the forearm muscles in holding and operating the device 10. This further reduces physical stress on the wrist 30. In preferred embodiments, the wrist 30 is elevated above the working surface when the hand 20 is positioned with the contact region 32 resting over the crown 16, substantially regardless of the angle of the forearm relative to the working surface.

As shown in FIGS. 4 and 5, the upper surface 12 extends downwardly from the crown 16 toward the front region 40 gradually with a gentle slope, ending at a front edge 48 located near the bottom 14. The gentle slope of the front region 40 of the upper surface 12 and the elevational of the wrist 30 by the crown 16 and back region 42 support the hand 20 with a relatively small angle at the MP joints of at least the second and third digits 22, 23, and desirably also the fourth and fifth digits 24, 25. For example, as shown in FIG. 5, the angles θ at the MP joints between the carpals and the proximal phalanges of the second and third digits 22, 23 are approximately the same, and are typically between about 10° and 50° of MP flexion. In some embodiments, the angle θ is about 2–40°. In the specific embodiment as illustrated in FIG. 5, the trackball device 10 supports the hand 20 in a manner such as the carpals of the second and third digits 22, 23 are substantially parallel to the bottom 14, and the angle θ is determined by the angle of an area of the upper surface 12 of the device 10 in front of the crown 16 relative to the bottom 14.

The gentle angles at the MP joints of the digits 22–25 promote a relaxed posture of the hand 20 in the region of the MP joints by avoiding extreme positions of full extension (i.e., flat position) or extreme flexion (i.e., tight fist position) of the MP joints for the digits 22–25. This is desirable due to the repetitive movement and application of forces about the MP joints for operating buttons with the second and/or third digits 22, 23 and holding the trackball device 10 with some or all of the digits 22–25.

The downward slope of the front region 40 allows the second and third digits 22, 23 to drape down in a more neutral and relaxed posture, such that they are not held in the air. Such a posture may reduce muscle strain.

In the specific embodiment shown, the back region 42 has a greater curvature in the rearward direction than the front region 40 in the forward direction, so that the upper surface 12 slopes downwardly more quickly in the back region 42 than in the front region 40, as illustrated by the contour lines 45 in FIG. 5. The back region 42 desirably has a sufficiently large curvature in the rearward direction (i.e., slopes downward sufficiently steeply) to substantially avoid contacting the carpal tunnel 36 of the user. This avoids adding pressure to the carpal tunnel 36 so as to reduce the pressure on carpal tunnel. It is understood that the curvature necessary to avoid substantially contacting the carpal tunnel 36 depends on the size of the hand 20 and, more particularly, the distance between the contact region 32 and the carpal tunnel 36. For a given hand size or a range of hand sizes, the back region 42 can be configured with a sufficient curvature to substantially avoid contacting the carpal tunnel 36.

The crown 16 of the upper surface 12 desirably supports the MP joint of the second digit 22 at a slightly higher elevation than the MP joint of the third digit 23 relative to the bottom 14. In an alternate embodiment, the MP joints of the second and third digits 22, 23 may be supported generally at the same elevation. Because the transverse hump 47 at the outside region 46 of the upper surface 12 which supports the MP joints of the fourth and fifth digits 24, 25 (and possibly a portion of the MP joint of the third digit 23) is sloped downward, those MP joints are disposed at a lower elevation than the MP joint of the second digit 22. The decrease in elevation from the second MP joint to the third through fifth MP joints generally along the transverse hump 47 allows the hand 20 to roll outwardly to the right and guides the hand away from full pronation (where the palm faces directly downward) toward a more neutral position with the palm tilted to face slightly inward to the left to reduce static loading. As shown in FIG. 3, the crown 16 is sufficiently wide (e.g., the width W may be at least about 1–1.5 inches) and the curvature of the outside region 46 in the outward direction is sufficiently mild, so that the hand 20 will not tend to slide off outwardly to the right. In a specific embodiment, the outside region 46 has a smaller curvature in the outward direction than the back region 42 of the upper surface 12 in the rearward direction.

As illustrated in FIGS. 1–7, the trackball device 10 includes an inner side surface 50 disposed on a side facing the thumb 21. The inner side surface 50 intersects the upper surface 12 along an inside ridge 51, and is formed between the ridge 51 and the bottom 14. As best seen in FIG. 5, the ridge 51 extends from the bottom 14 at the front edge 48 of the device 10 upward to the crown 16 and then downward to the bottom 14 at the rear edge of the device 10. The inside ridge 51 forms an inward border of the upper surface 12 and an upper border of the inner side surface 50. The inner side surface 50 has a rearward portion 52 extending in the rearward direction toward the back of the trackball device 10 where the back region 42 of the upper surface 12 is located.

As best seen in FIGS. 1 and 2, the back of the device 10 is skewed utwardly to the right. The rearward portion 52 of the inner side surface 50 and the back region 42 of the upper surface 12 are formed to be located outwardly to the right of the thenar region 34 of the hand 20, so as to substantially avoid supporting the thenar region 34. As a result, the device 10 is shaped to create a "thenar void" to allow the thumb 21 to hang down in a substantially neutral thumb position and to move freely relative to the device 10 without interference from a thenar support provided in conventional trackball devices. The thenar region 34 is substantially free of pressure or loading that would otherwise be present if a thenar support were provided to support the thenar region 34. Thus, the back region 42 contacts and supports the hypothenar region 35 of the hand 20 as a hypothenar region support surface, but not the thenar region 34 or the carpal tunnel 36 except for incidental side contact with the thenar region 34.

As best seen in FIG. 5, the trackball device 10 includes a ball 58 having a portion exposed from the inner side surface 50 to face the thumb 21. The ball 58 is desirably positioned and sized for comfortable placement of the distal phalange 26 of the thumb 21 to allow the thumb 21 to move the ball 58 in different directions with ease.

The inner side surface 50 desirably is concave in a region adjacent the ball 58, as shown in FIGS. 1, 3, 5, and 6. The inner side surface 50 has a ledge 53 disposed below and inwardly of the ball 58 and a guide edge 54 disposed above and outwardly of the ball 58. The ledge 53 is configured to support the distal phalange 26 of the thumb 21 at rest, although the thumb 21 may rest on the working surface instead. The ledge 53 may be inclined as shown, or be substantially horizontal in an alternate embodiment. The concave inner side surface 50 advantageously creates an open space around the ball 58 to provide the thumb 21 with substantial freedom of movement to operate the ball 58 with no or minimal interference from the housing of the device 10. In this way, the user can maintain the hand 20 on the upper surface 12 of the device 10 while operating the ball 58, and does not need to lift the hand 20 or assume any awkward or stressful positions to maneuver the thumb 21 around the housing in order to manipulate the ball 58.

Figure 6:
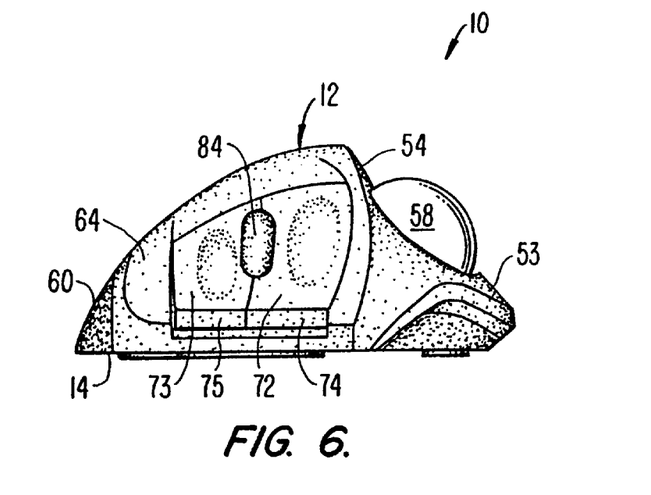
FIG. 6 is a rear elevational view of the trackball device of FIG. 1.
Figure 7:
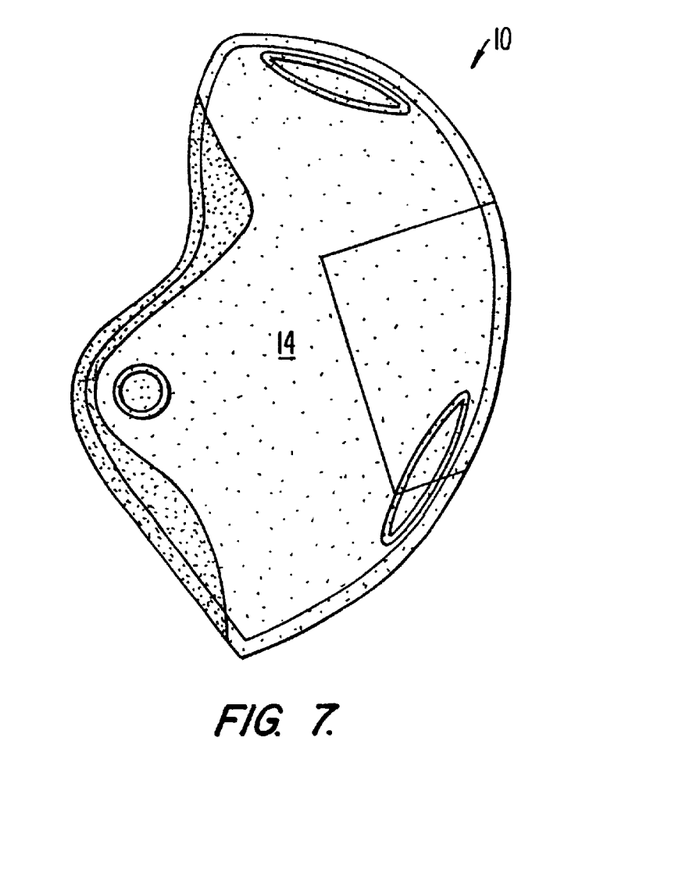
FIG. 7 is a bottom plan view of the trackball device of FIG. 1.

The guide edge 54 is configured to guide the distal portion of the thumb 21 in rotating the ball 58. As best seen in FIG. 2, the guide edge 54 is generally straight along the portion just above the ball 58. The guide edge 54 may be inclined as shown in FIG. 6, or substantially vertical. The ball 58 is adapted to control movement of a cursor. In a specific embodiment, the ball 58 is configured to move the cursor in up-and-down directions when the ball 58 is rotated by the thumb 21 guided by the guide edge 54.

In another embodiment, the ball 58 is configured to move the cursor in up-and-down directions with rotation of the ball 58 by the thumb 21 moving in a direction along its phalanges 26, 28. Rotation of the thumb 21 around its MP joint moves the cursor in side-to-side directions. Such an arrangement minimizes awkward movement of the thumb 21 during normal operation of the ball 58, thereby reducing stresses and loading on the user's hand.

The upper surface 12 desirably is sufficiently high relative to the bottom, particularly at the crown 16 and in the back region 42, to allow the distal phalange 26 of the thumb 21 to rest on the ledge 53 or the working surface in a rest position between adduction and abduction when desired, as illustrated in FIG. 5. For example, the maximum height of the crown 16 is at least about 1.25 inches, more desirably about 1.5–2.25 inches. Abduction refers to movement of the thumb 21 away from the palm of the hand 20. Palmar abduction occurs when the position of the thumb 21 is away from and generally perpendicular to the plane of the palm, while radial abduction occurs when the position of the thumb 21 is away from and generally parallel to the plane of the palm. Adduction refers to a position where the thumb 21 lies generally on the plane of the palm and is oriented in a forward direction toward the front of the hand. Arrow 55 shows the movement of the thumb 21 toward abduction, and arrow 56 shows the movement of the thumb 21 toward adduction. Abduction of the thumb 21 occurs when the upper surface 12 positions the thenar region 34 too high above the working surface, and/or the ball 58 is positioned too far from the crown 16. Adduction occurs if the upper surface 12 positions the thenar region 34 too close to the working surface. Both abduction and adduction involve extreme positions in the range of posture for the thumb 21 with significant static loading, and are thus undesirable. The thumb 21 is involved in holding the trackball device 10 and in operating a trackball. It is advantageous to maintain the thumb 21 in a substantially neutral position to reduce static muscle loading on the thumb 21. In a specific embodiment, the device 10 supports the thumb 21 on the ledge 53 (or alternatively on the working surface) in a rest position that is approximately half-way between adduction and abduction.

Moreover, when the thumb 21 reaches the highest position during rotation of the ball 58, its elevation desirably is no higher than that of the second digit 22. The thumb 21 thus substantially stays away from abduction while rotating the ball 58 to reduce overall strain. In addition, the ball 58 is positioned sufficiently close to the crown 16 to ensure that the thumb 21 is not flexed leftward so much in abduction as to result in significant strain during rotation of the ball 58. To avoid the extreme positions of abduction and adduction, the thumb 21 is desirably maintained within an angle of about 20°–60° measured from the metacarpal bone of the second digit 22.

As shown in FIGS. 2–4 and 6, an outer side surface 60 is disposed on the right side of the device 10 to face the distal phalange 26 of the fifth digit 25 of the hand 20. The outer side surface 60 extends between the outside region 46 of the upper surface 12 and the bottom 14. The outer side surface 60 is provided to contact the fifth digit 25, typically at its distal phalange 26 and optionally its middle phalange 27. As shown in FIGS. 2, 4, and 6, the outside region 46 of the upper surface 12 includes a depressed or concave portion 64 for supporting the fourth digit 24 thereon adjacent the outer side surface 60. An outside ridge 65 is formed between the depressed portion 64 and the outer side surface 60. In this embodiment, the outer side surface 60 is configured to contact only the fifth digit 25. The depressed portion 64 provides stable support for the fourth digit 24 and prevents it from sliding outwardly to the right. In another embodiment, the outer side surface 60 may be configured for supporting the fourth digit 24 as well.

As shown in FIGS. 1, 2, and 6, the device 10 includes in the front region 40 of the upper surface 12 a second digit button 72 on which to place the second digit 22, and a third digit button 73 on which to place the third digit 23. The second digit button 72 is arranged to be generally aligned with the phalanges of the second digit 22, which are generally aligned with the axis of flexion of the MP joint of the second digit 22. The third digit button 73 is arranged to be generally aligned with the phalanges of the third digit 23, which are generally aligned with the axis of flexion of the MP joint of the third digit 23. Because the movements of the second and third digits 22, 23 are mainly around their respective MP joints, the general alignment allows the second and third digits 22, 23 to operate the buttons 72, 73 efficiently by pressing downward in a substantially neutral position, so that the movements of those digits 22, 23 are substantially along the axes of flexion of the respective MP joints. This avoids awkward or strained movements such as twisting or lateral movements of the digits 22, 23 (i.e., abduction or adduction) which may give rise to significant physical stresses. The buttons 72, 73 desirably are sufficiently long to accommodate a range of hand and finger sizes to allow them to operate the trackball device 10 and buttons 72, 73 while positioning the MP joint of the second digit 22 and at least a portion of the MP joint of the third digit 23 substantially over the crown 16 of the upper surface 12. In addition, the ball 58 is sized and positioned to accommodate differently sized hands, allowing the thumb to operate with relative ease while the hand is supported over the crown 16.

The second and third digit buttons 72, 73 include forward edges 74, 75 that are disposed adjacent the front edge 48 of the housing of the device 10. The forward edges 74, 75 are desirably elevated above the front edge 48 of the device 10. This makes it easier to activate the buttons 72, 73 even if the second and third digits 22, 23 extend past the forward edges 74, 75 of the buttons 72, 73. In the specific embodiment as best seen in FIGS. 4 and 6, the forward edges 74, 75 hang over the front edge 48 of the device 10.

Both the second and third digit buttons 72, 73 are lower in elevation than the crown 16. The buttons 72, 73 desirably include depressed or indented contacts 72A, 73A for more stable support of the digits 22, 23 and to reduce the likelihood of sliding of the hand 20 outwardly to the right off the upper surface 12 of the device 10.

As shown in FIGS. 1, 2, 4, and 6, a wheel or roller 84 is disposed between the second and third digit buttons 72, 73. The roller 84 is supported to be rotatable relative to the housing of the device 10, for instance, on a shaft disposed inside the device 10. The roller 84 is typically configured to be manipulated by the second digit 22, and desirably is oriented to rotate generally along the phalanges of the second digit 22. The phalanges of the second digit 22 are generally aligned with the axis of flexion of the MP joint of the second digit 22. Because the movement of the second digit 22 is mainly around the MP joint, the general alignment allows the second digit 22 to operate the roller 84 efficiently in a substantially neutral position, so that the movement of the second digit 22 is substantially along the axis of flexion of its MP joint. This avoids awkward or strained movements which may cause significant physical stresses.

Alternatively, the roller 84 is oriented to rotate generally along the phalanges of the third digit 23 to be manipulated by the third digit 23. The roller 84 may also be oriented to rotate in a direction generally between the phalanges of the second digit 22 and the phalanges of the third digit 23 to allow operation with either the second or third digit 22, 23.

The configuration, contours, and slopes of the trackball device 10 as illustrated in FIGS. 1–7 are merely illustrative of a specific embodiment of the invention. It is appreciated that modifications can be made while still achieving the objects of the invention.

The principles of the present invention can be used for constructing rackball devices for hands of different sizes. For example, the shape of the trackball can be scaled up or down without substantial alterations to the relative angles and relative dimensions. The length of the trackball device from the front end to the back end may be adjusted according to the distance between the tip of the third index 23 and the wrist 30. For instance, the length of the device may be equal to about 0.9–1.1 times the distance between the tip of the third index 23 and the wrist 30. In addition, the internal components may stay the same, so that only the housing is replaced. The internal components may be mounted onto the bottom, and only the upper portion of the housing need be replaced. The upper portion may comprise a shell that is detachably connected to the bottom. Furthermore, the finger-operated buttons may remain unchanged. In that case, the detachable shell includes openings to expose the buttons and the ball upon being connected to the bottom.

The above-described arrangements of apparatus and methods are merely illustrative of applications of the principles of this invention and many other embodiments and modifications may be made without departing from the spirit and scope of the invention as defined in the claims. For instance, the number and configuration of the finger-operated pointing members provided on the device may be modified. An example of an arrangement with the roller supported on a middle button spaced between the two buttons can be found in U.S. patent application Ser. No. 09/408,089, filed Sep. 29, 1999, which is incorporated herein by reference in its entirety. The scope of the invention should, therefore, be determined not with reference to the above description, but instead should be determined with reference to the appended claims along with their full scope of equivalents.

What is claimed is:

1. A pointing device for use on a working surface, the device comprising a housing which includes:
   a bottom configured to be placed on the working surface;
   at least one finger-operated pointing member; and
   an upper surface including a crown for contacting a palmar region of the palm of the hand of a user substantially at the metacarpal-phalangeal joint of the second digit and at least a portion of the metacarpal-phalangeal joint of the third digit, the crown being higher in elevation than remaining portions of the upper surface relative to the bottom, the upper surface extending from the crown downwardly in a forward direction toward the tips of the second and third digits to form a front region, downwardly in a rearward direction toward the wrist of the user to form a back region, and downwardly in an outward direction toward the metacarpal-phalangeal joints of the fourth and fifth digits to form an outside region, the back region being formed to be located outwardly of the thenar region of the palm to substantially avoid supporting the thenar region.

2. The device of claim 1 wherein the crown and the back region of the upper surface are sufficiently high relative to the working surface to maintain the wrist above the working surface.

3. The device of claim 1 wherein the back region has a greater curvature in the rearward direction than the outside region in the outward direction.

4. The device of claim 1 wherein the upper surface has a height to support the hand relative to the working surface in a manner to allow the distal phalange of the thumb to rest on the working surface between adduction and abduction.

5. The device of claim 1 wherein the outside region of the upper surface includes a transverse hump extending from the crown in the outward direction for contacting a palmar region of the palm of the hand substantially at the metacarpal-phalangeal joints of the fourth and fifth digits.

6. The device of claim 1 wherein the housing further includes an inner side surface disposed on a side to face the thumb, the inner side surface extending between the upper surface and the bottom, the inner side surface having a rearward portion extending toward the wrist, the rearward portion of the inner side surface and the back region of the upper surface being formed to be located outwardly of the thenar region of the palm to substantially avoid contacting the thenar region.

7. The device of claim 6 wherein the at least one finger-operated pointing member comprises a trackball having a portion exposed from the inner side surface to face the thumb.

8. The device of claim 7 wherein the inner side surface is generally concave in a region adjacent the trackball.

9. The device of claim 7 wherein the inner side surface has a ledge disposed below and inwardly of the trackball, the ledge being configured to support the distal phalange of the thumb between adduction and abduction.

10. The device of claim 7 wherein the inner side surface has a guide edge disposed above and outwardly of the trackball, the guide edge being generally straight to guide the distal portion of the thumb in rotating the trackball.

11. The device of claim 7 wherein the trackball is adapted to control movement of a cursor, the trackball being configured to move the cursor in up-and-down directions with rotation of the trackball by the thumb moving along the phalanges of the thumb.

12. The device of claim 7 wherein the trackball is adapted to control movement of a cursor, the trackball being configured to move the cursor in side-to-side directions with rotation of the trackball by the thumb rotating around the metacarpal-phalangeal joint of the thumb.

13. The device of claim 1 wherein the at least one finger-operated pointing member comprises in the front region of the upper surface a second digit button on which to place the second digit and a third digit button on which to place the third digit, the second digit button being arranged to be generally aligned with the phalanges of the second digit, the third digit button being arranged to be generally aligned with the phalanges of the third digit.

14. The device of claim 13 wherein the second and third digit buttons each have an indentation for supporting the second and third digits, respectively.

15. The device of claim 13 wherein the at least one finger-operated pointing member comprises a roller disposed between the second digit button and the third digit button, the roller being rotatable relative to the housing, the roller being oriented to rotate generally along the phalanges of the second digit.

16. The device of claim 1 wherein the housing further comprises an outer side surface disposed on a side to face the distal phalange of the fifth digit of the hand, the outer side surface extending between the outside region of the upper surface and the bottom.

17. The device of claim 16 wherein the outside region of the upper surface includes a depressed or concave portion for supporting the fourth digit thereon adjacent the outer side surface.

18. The device of claim 1 wherein the back region has a greater curvature in the rearward direction than the front region in the forward direction.

19. The device of claim 1 wherein the back region has a sufficiently large curvature in the rearward direction to substantially avoid contacting the carpal tunnel region of the palm.

20. A computer trackball device for use on a working surface, the device comprising a housing which includes:
   a bottom;
   an upper surface comprising:
      a crown on which to rest a palnar region of the palm of the hand of a user substantially at the metacarpal-phalangeal joint of the second digit and at least a portion of the metacarpal-phalangeal joint of the third digit, the crown being higher in elevation than remaining portions of the upper surface relative to the bottom;
      a front region on which to rest the second and third digits, the front region extending downwardly from the crown in a forward direction; and
      a back region on which to rest the hypothenar region of the hand, the back region extending downwardly from the crown in a rearward direction and being configured to substantially avoid contacting the carpal tunnel of the hand;
   an inner side surface on which to place the thumb; and
   an outer side surface on which to place the fifth digit,
   wherein the device further comprises a trackball having a portion exposed from the inner side surface to face the thumb.

21. The device of claim 20 wherein the front region includes:
   a second digit button on which to place the second digit, the second digit button being arranged to be generally aligned with the phalanges of the second digit;
   a third digit button on which to place the third digit, the third digit button being arranged to be generally aligned with the phalanges of the third digit; and
   a roller disposed between the second digit button and the third digit button, the roller being rotatable relative to the housing, the roller being oriented to rotate generally along one of the second digit and the third digit.

22. The device of claim 20 wherein the housing further comprise a transverse hump on which to rest a palmar region of the palm of the hand substantially at the metacarpal-phalangeal joints of the fourth and fifth digits, the transverse hump extending from the crown in an outward direction, wherein the back region has a greater curvature in the rearward direction than the transverse hump in the outward direction.

23. The device of claim 20 wherein the inner side surface is generally concave in a region adjacent the trackball, wherein the inner side surface has a ledge disposed below and inwardly of the trackball and a guide edge disposed above and outwardly of the trackball, the ledge being configured to support the distal phalange of the thumb between adduction and abduction, the guide edge being generally straight to guide the distal portion of the thumb in rotating the trackball.

24. A pointing device for use on a working surface, the device comprising a housing which includes a bottom, an upper surface, and at least one finger-operated pointing member, the upper surface including:
   a crown on which to rest a palmar region of the palm of the hand of a user substantially at the metacarpal-phalangeal joint of the second digit and at least a portion of the metacarpal-phalangeal joint of the third digit, the crown being higher in elevation than remaining portions of the upper surface relative to the bottom;
   a transverse hump on which to rest a palmar region of the palm of the hand substantially at the metacarpal-phalangeal joints of the fourth and fifth digits, the transverse hump extending from the crown in an outward direction;
   a front region on which to rest the second and third digits, the front region extending downwardly from the crown in a forward direction; and
   a back region on which to rest the hypothenar region of the hand, the back region extending downwardly from the crown in a rearward direction and being configured to substantially avoid contact with the carpal tunnel of the hand.

25. The device of claim 24 wherein the housing further includes:
   an inner side surface on which to place the thumb; and
   an outer side surface on which to place the fifth digit.

26. The device of claim 25 wherein the at least one finger-operated pointing member comprises a trackball having a portion exposed from the inner side surface to face the thumb, wherein the inner side surface is generally concave in a region adjacent the trackball.

27. The device of claim 24 wherein the front region has a curvature in the forward direction to support the second and third digits so that the metacarpal-phalangeal joints of the second and third digits have angles between about 10° and about 50° of metacarpal-phalangeal flexion.

28. The device of claim 24 wherein crown and the back region of the upper surface are sufficiently high relative to the bottom to allow the thumb to hang in a position between abduction and adduction during operation of the device.

29. The device of claim 24 wherein the transverse hump extends from the crown downwardly to guide the hand away from full pronation.

30. The device of claim 24 wherein the back region has a greater curvature in the rearward direction than the front region in the forward direction.

31. The device of claim 25 wherein the upper surface, the inner side surface, and the outer side surface are detachably coupled to the bottom.

32. The device of claim 31 wherein the upper surface, the inner side surface, and the outer side surface are formed as a shell that is detachably coupled to the bottom.

33. The device of claim 32 wherein the bottom is adapted to be connected with shells of different sizes to accommodate differently sized hands.

34. The device of claim 24 wherein the housing includes an inner side surface facing the thumb, wherein the at least one finger-operated pointing member comprises a trackball having a portion exposed from the inner side surface, and wherein the upper surface and the trackball are configured so that the thumb stays within an angle of about 20° to about 60° measured from the metacarpal bone of the second digit during operation of the device.

* * * * *